(12) United States Patent
Jeong et al.

(10) Patent No.: US 9,156,686 B2
(45) Date of Patent: Oct. 13, 2015

(54) MANUFACTURING METHOD OF CNT EMITTER WITH DENSITY CONTROLLED CARBON NANOTUBE

(75) Inventors: Jin Woo Jeong, Daejeon (KR); Jun Tae Kang, Daegu (KR); Yoon Ho Song, Daejeon (KR); Jae Woo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 641 days.

(21) Appl. No.: 13/483,547

(22) Filed: May 30, 2012

(65) Prior Publication Data

US 2012/0308716 A1 Dec. 6, 2012

(30) Foreign Application Priority Data

May 31, 2011 (KR) .......................... 10-2011-0052170

(51) Int. Cl.

| | |
|---|---|
| *B05D 5/12* | (2006.01) |
| *B82Y 10/00* | (2011.01) |
| *H01J 9/04* | (2006.01) |
| *B82Y 30/00* | (2011.01) |
| *B82Y 40/00* | (2011.01) |
| *H01J 9/02* | (2006.01) |
| *H01J 1/304* | (2006.01) |

(52) U.S. Cl.
CPC .................. *B82Y 10/00* (2013.01); *B82Y 30/00* (2013.01); *B82Y 40/00* (2013.01); *H01J 9/025* (2013.01); *H01J 9/042* (2013.01); *H01J 1/3048* (2013.01); *H01J 2201/30469* (2013.01)

(58) Field of Classification Search
None
See application file for complete search history.

(56) References Cited

U.S. PATENT DOCUMENTS

| 2009/0200912 A1* | 8/2009 | Ren et al. ....................... 313/311 |
| 2009/0272431 A1* | 11/2009 | Usui et al. ..................... 136/256 |
| 2010/0047564 A1* | 2/2010 | Kim et al. ...................... 428/336 |
| 2010/0285715 A1* | 11/2010 | Li et al. ............................ 445/50 |
| 2010/0288980 A1 | 11/2010 | Ittel |
| 2011/0116603 A1* | 5/2011 | Kim et al. ...................... 378/119 |

FOREIGN PATENT DOCUMENTS

KR      10-0979387 B1     8/2010

\* cited by examiner

*Primary Examiner* — Shamim Ahmed
*Assistant Examiner* — Bradford Gates
(74) *Attorney, Agent, or Firm* — Rabin & Berdo, P.C.

(57) ABSTRACT

Provided is a manufacturing method of a CNT emitter with density controlled CNT, comprising: (i) fabricating a CNT paste by dispersing a carbon nanotube (CNT) powder, two kinds or more of inorganic fillers which have a lower melting temperature than the CNT and different oxidation degrees of the CNT, and an organic binder in a solvent; (ii) coating the CNT paste on an electrode formed above a substrate; (iii) sintering the substrate coated with the CNT paste to selectively oxidize the CNT around one kind of inorganic filler among two kinds or more of the inorganic fillers; and (iv) treating the surface of the CNT paste so that the surface of the CNT paste is activated.

12 Claims, 2 Drawing Sheets

MANUFACTURING METHOD OF CNT EMITTER WITH DENSITY CONTROLLED CARBON NANOTUBE

CROSS-REFERENCE TO RELATED APPLICATIONS

This application is based on and claims priority from Korean Patent Application No. 10-2011-0052170, filed on May 31, 2011, with the Korean Patent Office, the disclosure of which is incorporated herein in its entirety by reference.

TECHNICAL FIELD

The present invention relates to a manufacturing method of a CNT emitter for a field emission device (FED) having high reliability by mixing two kinds or more of inorganic fillers having different oxidation degrees of CNTs as a constituent component of a CNT paste.

BACKGROUND

A principle of emitting electrons is largely divided into thermal emission and field emission. Among them, recently, a lot of researches for the field emission have been conducted. A principle of the field emission is to emit electrons from an emitter when an electric field is applied to a conductive emitter in vacuum and recently, a material which has recently been in the limelight as an electron emission source (emitter) is a carbon nanotube (CNT). Since the CNT has a geometric structure with low work function and a high aspect ratio, a field emission factor is very large. Accordingly, the electrons may be easily emitted under a low electric field. A method of forming the CNT as an emitter on an electrode is a method in which the CNT is fabricated in a paste form to be screen-printed on a substrate and the method has advantages in that fabrication cost is low and mass production is possible.

Meanwhile, FIG. 1 is an enlarged cross-sectional view of an emitter formed by coating a CNT paste made by adding metallic particles having micrometer or nanometer sizes on an electrode substrate, in order to increase adhesion between a CNT emitter and a cathode electrode. The geometric characteristic of the CNT due to the high aspect ratio may be a large advantage as the emitter, but may be a disadvantage in that the CNT is hardly evenly dispersed with uniform density. Currently, various methods has been proposed as a method of dispersing the CNT, but since the process is complicated and although the dispersion is sufficient, dispersity becomes easily deteriorated again during a paste fabricating process and as a result, there is a problem in that the CNTs are reaggregated. Due to the problem, the CNTs are partially concentrated as shown in FIG. 1A in the implemented CNT emitter to deteriorate uniformity and prevent electron emission due to a screen effect and as a result, the emitter characteristic is deteriorated.

SUMMARY

The present invention has been made in an effort to provide a CNT emitter for a field emission device having high reliability capable of increasing and activating uniformity of electron emission sites while density of CNTs is controlled, by fabricating a CNT paste by using two kinds or more of metallic particles having different oxidation degrees of the CNTs as a filler, and coating and sintering the fabricated CNT paste on an electrode substrate.

Other technical objects desired to be achieved in the present invention are not limited to the aforementioned objects, and other technical objects not described above will be apparent to those skilled in the art from the disclosure of the present invention.

An exemplary embodiment of the present invention provides a manufacturing method of a CNT emitter with density controlled CNTs, the method comprising steps of: (i) fabricating a CNT paste by dispersing a carbon nanotube (CNT) powder, two kinds or more of inorganic fillers which have a lower melting temperature than the CNT and different oxidation degrees of the CNTs, and an organic binder in a solvent; (ii) coating the CNT paste on an electrode formed above a substrate; (iii) sintering the substrate coated with the CNT paste to selectively oxidize the CNTs around one kind of inorganic filler among two kinds or more of the inorganic fillers; and (iv) treating the surface of the CNT paste so that the surface of the CNT paste is activated.

The two kinds or more of inorganic fillers may include a first inorganic filler having a high standard reduction potential to CNT and a second inorganic filler having a low standard reduction potential to CNT.

The first inorganic filler may include a metal selected from a group consisting of Au, Pt, Ag, Cu, Pd, W, and Ni or an alloy thereof, and the second inorganic filler may include a metal selected from a group consisting of In, Fe, Zn, Ti, Cr, Mn, Al, and Ni or an alloy thereof.

In the manufacturing method of the CNT emitter of the present invention, the sintering step (iii) may include the steps of first sintering in the range of 250 to 300° C. under the atmosphere; and second sintering in the range of 350 to 450° C. under the atmosphere. The sintering step (iii) may further include the step of third sintering in the range of 800 to 900° C. under vacuum condition.

In this case, the sintering condition and the sintering temperature range of the first to third sintering steps may be properly changed depending on the kind of inorganic filler, the kind of organic binder and the contents thereof and are not limited to the aforementioned range.

The treating of the surface (iv) may be performed so that the CNTs are vertically arranged.

In the fabricating (i), the CNT paste may be dispersed by adding two kinds or more of inorganic fillers having different oxidation degrees of the CNTs and an organic binder into a dispersion liquid which is formed by dispersing the CNTs in a solvent.

In the emitter of the present invention manufactured as described above, the CNT density may be controlled so that an average distance between the vertically arranged CNTs is larger than or equal to the length of the CNT itself.

According to the exemplary embodiment of the present invention, kinds of metallic particles added in an inorganic filler and a composition thereof are controlled while a known fabricating process of a CNT paste is used as it is, thereby finally manufacturing an emitter with controlled CNT density through the sintering process. As a result, uniformity of electron emission sites is increased and a screen effect of concentrated CNTs is reduced to increase the activated electron emission sites, thereby largely improving reliability of the CNT emitter.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, in order to describe in detail the present invention, exemplary embodiments according to the present invention will be described in detail with reference to the accompanying drawings. However, the present invention is not limited to exemplary embodiments and drawings to be described below and may also be realized or modified in various ways.

Figure 2:
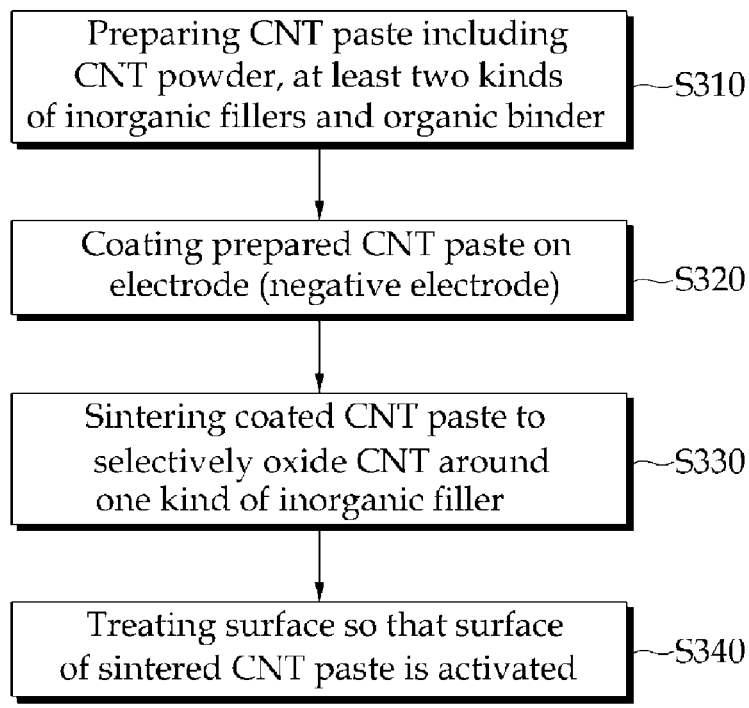
FIG. 2 is a manufacture block diagram illustrating a manufacturing method of a CNT emitter according to the exemplary embodiment of the present invention.

FIG. 2 is a manufacture block diagram illustrating a method of manufacturing a CNT emitter according to the exemplary embodiment of the present invention.

1) Fabricating a CNT Paste (S310)

Referring to FIG. 2, in order to manufacture an emitter formed at an electron emission unit of a field emission device, a CNT paste is prepared (S310).

The CNT paste of the present invention includes a CNT powder, two kinds or more of inorganic fillers, and an organic binder. As a preferable manufacturing example, the CNT paste may be formed by adding and dispersing two kinds or more of inorganic fillers having different oxidation degrees of the CNTs and an organic binder into a dispersion liquid which is formed by dispersing the CNTs in a solvent.

Herein, the carbon nanotube (CNT) may use a general carbon nanotube known in the art without particular limitation. As a non-limited example, the CNTs may include a single-walled carbon nanotube (SWNT), a double-walled carbon nanotube (DWNT), a multi-walled carbon nanotube (MWNT), a rope carbon nanotube, or a mixture thereof. As an example, in the present invention, a thin multiwall CNT of which a diameter is 3 to 7 nm and preferably 4 to 5 nm may be used.

Two kinds or more of inorganic fillers mixed with the CNTs are not particularly limited so long as the inorganic fillers are materials having lower melting temperatures than the CNTs and different oxidation degrees of the CNTs. In this case, the inorganic fillers may use high conductive metals or an alloy thereof in which an ohmic contact can be performed in order to lower interface resistance between the CNTs, interface resistance between the CNT and a negative electrode in the CNT emitter manufactured by the CNT paste, and the like.

Two kinds or more of inorganic fillers constituting the CNT paste serve to selectively oxidize and remove the CNTs by using a Galvanic corrosion according to a difference in a reduction potential between the inorganic fillers which are in contact with the CNT powder, respectively. As a result, the two kinds or more of inorganic fillers may include a first inorganic filler 310 having a high standard reduction potential to CNT and a second inorganic filler 320 having a low standard reduction potential, under a sintering condition of a predetermined temperature, for example, 350° C.

Non-limited examples of the first inorganic filler 310 include a metal selected from a group consisting of Au, Pt, Ag, Cu, Pd, W, and Ni or an alloy thereof, and the like. Non-limited examples of the second inorganic filler 320 include a metal selected from a group consisting of In, Fe, Zn, Ti, Cr, Mn, Al, and Ni or an alloy thereof, and the like. In this case, Ni, as a metal positioned at a boundary condition of the first inorganic filler and the second inorganic filler, may be used as the first inorganic filler or the second inorganic filler according to the kinds of CNTs to be used or the sintering condition.

In general, the CNT starts to be oxidized at about 500 to 600° C. in the atmosphere. For example, Ag belongs to a metal having the most excellent conductivity and oxidizes most of the CNTs at a temperature of about 350° C. or more in the atmosphere. Zn having high conductivity is stable in the atmosphere up to 400° C., but the oxidation degree thereof is largely increased at about 450° C. or more. Metallic oxides having high conductivity may also be used as the inorganic filler in addition to the aforementioned metals. For example, indium titanium oxide (ITO) hardly oxidizes the CNT even at about 450° C.

Meanwhile, an inorganic filler having a metallic particle form may have several to several tens of nano (nm) size so as to be melted at a lower temperature than a thermal damage temperature of the CNT powder and for example, may have 1 to 10 nm of size. The inorganic filler may be used in both a powder form and a paste form and in the case of the powder form, the inorganic filler is added and dispersed when the CNT powder is dispersed in the solvent.

Since the carbon nanotube (CNT) has a form having a diameter of nanometer and a length of micrometer, the CNTs are easily entangled and agglomerated because of the structural characteristic thereof. Since the CNTs are dispersed well by various methods, but reaggregated (agglomerated) before long, it is very difficult to maintain the CNTs in a properly dispersed state. However, in the present invention, as described above, by mixing two kinds or more of various inorganic fillers which have relatively excellent dispersity as compared with the CNTs and easily maintain the dispersity, uniformity may be improved due to the excellent dispersity and the continuous dispersity maintaining effect. Adhesion and an electric characteristic of the emitter may also be improved.

The CNT powder and two kinds or more of inorganic fillers according to the present invention can be dispersed in most solvents (an aqueous solvent, an organic solvent, and the like). In this case, by considering a reaggregation characteristic of a nano material such as the CNT, it is preferred that a solvent having a good surface active property is used if possible. It is more preferred that a solvent having a high evaporation temperature, for example, a boiling point of about 150° C. or more is additionally used in order to prevent rapid evaporation. For example, the CNT powder and the inorganic filler may be dispersed by mixing isopropyl alcohol (IPA), terpineol, and the like which have the good surface active property.

It is preferred that the CNT powder and two kinds or more of inorganic fillers, which are used when fabricating the CNT paste, have a proper composition ratio in consideration of a shape of the CNT emitter to be manufactured or density of the CNT. In this case, the composition ratio thereof may be controlled within a general range known in the art.

The organic binder used in the CNT paste may use a general polymer in the art which is used in a paste for forming the CNT emitter without limitation. For example, acryl resins, ethylcellulose or the like may be used. The content of the organic binder may be properly controlled within a general range, in consideration of adhesion and viscosity of the CNT paste.

2) Coating the CNT Paste on an Electrode (S320)

As described above, when the fabricating of the CNT paste (S310) is completed, the CNT paste is coated on an electrode (negative electrode) 200 which is formed on a substrate 100 of a field emission device (S320).

Figure 3:
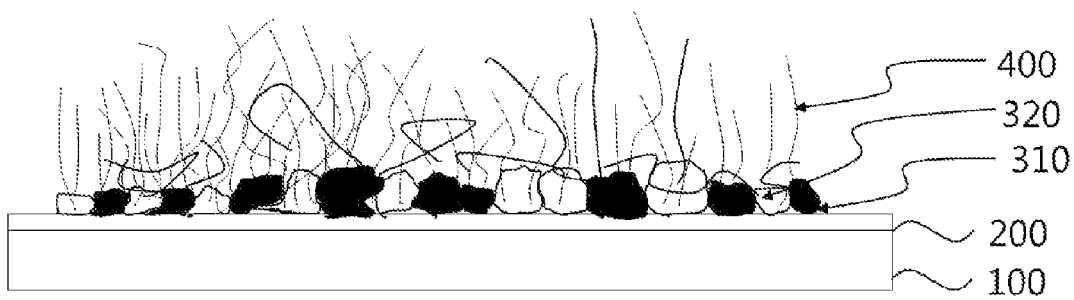
FIG. 3 is a cross-sectional view illustrating a state where a CNT paste, in which two kinds or more of inorganic fillers are added, is coated on a substrate according to an exemplary embodiment of the present invention.

FIG. 3 is a cross-sectional view illustrating a state where a CNT paste, in which two kinds or more of inorganic fillers are added, is coated on a substrate according to an exemplary embodiment of the present invention. As shown in FIG. 3, the CNT paste is uniformly coated on the entire surface of the negative electrode 200 and the formed CNT paste layer includes CNTs 400 and two kinds or more of inorganic filler 310 and 320. In this case, the first inorganic filler 310 and the second inorganic filler 320 have a form of contacting a plurality of CNTs 400, respectively.

As described above, when the CNT paste is coated on the electrode 200, a general coating method known in the art may be used without limitation and a process such as screen printing, spin coating and the like may be used depending on viscosity of the CNT paste.

3) Sintering the CNT Paste (S330)

As described above, after the CNT paste is coated on the electrode, the sintering of the CNT paste (S330) is performed.

In the present invention, the sintering step of the CNT paste (S330) comprises the steps of first sintering in the range of 250 to 300° C. under the atmosphere, and second sintering in the range of 350 to 450° C. under the atmosphere to be performed.

The first sintering step causes burning-out of the organic binder included in the CNT paste and thus the organic binder is mostly removed.

In the second sintering step, the CNTs are selectively oxidized and removed by two kinds or more of inorganic fillers having different oxidation degrees of the CNTs.

That is, the first inorganic filler 310 and the second inorganic filler 320 are relatively very uniformly dispersed as compared with the CNTs on the CNT paste. In this case, when the second sintering is performed, the CNTs near the first inorganic filler 310 having a relatively high reduction potential as compare with the CNT are oxidized by a Galvanic corrosion process to be selectively removed. In comparison, the CNTs around the second inorganic filler 320 exist as they are. The CNTs around the inorganic fillers are selectively oxidized by different reduction potentials between the first and second inorganic fillers and as a result, the density of the CNTs is controlled. In addition to partial oxidation of the CNTs, in the second sintering step, melting of the inorganic filler or final removal of the organic binder may be caused depending on the kinds of particles.

In the present invention, as necessary, third sintering in the range of 800 to 900° C. under vacuum condition may be further included.

In the third sintering step, the inorganic filler of a metallic particle form is melted under the aforementioned condition (vacuum atmosphere and at a temperature of 800 to 900° C.) and organic matter remaining on the CNT surface is finally removed. In this case, the inorganic filler is completely melted to improve adhesion with the substrate 100.

In this case, the sintering atmosphere and the sintering temperature range of the first to third sintering steps may be properly changed depending on the kind of inorganic filler, the kind of organic binder and the contents thereof and are not limited to the aforementioned range.

Figure 4:
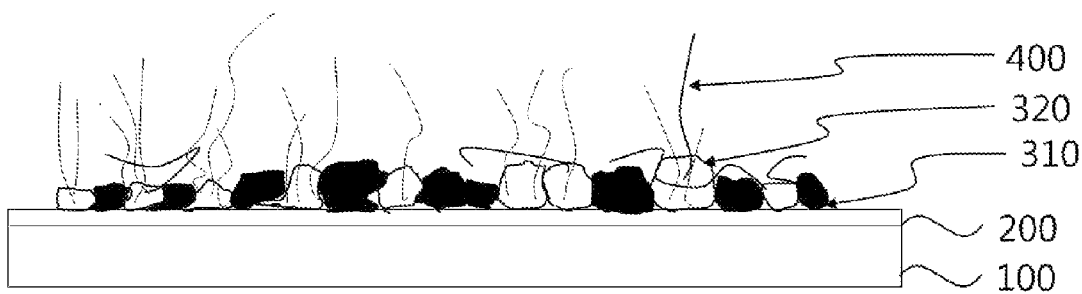
FIG. 4 is an enlarged cross-sectional view of a CNT emitter in which one kind of inorganic filler among two kinds or more of inorganic fillers is selectively oxidized and completed by sintering the CNT paste of FIG. 3 two times or more.

FIG. 4 is an enlarged cross-sectional view of a CNT emitter which is completed by sintering the CNT paste of FIG. 3. When the removal of the organic binder, the activation of the field emission site, the partial oxidation of the CNTs and melting of the metallic particles are performed through the sintering, as shown in FIG. 4, the CNT emitter, which has proper density and is uniformly distributed, is strongly adhered on the negative electrode.

4) Surface-Treating the CNT Paste (S340)

Subsequently, surface treatment is performed so that the surface of the CNT emitter is activated (S350). The surface treatment may be performed so that the CNTs are vertically arranged through step S350.

The surface treatment may be performed after the first sintering in which the organic binder is removed, or after the second sintering so that the surface of the CNT paste is activated. The surface treatment may be performed after the third sintering.

Examples of the surface treatment include plasma treatment, high field treatment, tapping treatment, rolling treatment and the like and it is preferred that out gassing is removed in vacuum, glue is not smear, and simple rolling treatment or tapping treatment is used. In this case, in the case of the tapping treatment, the glue of a tape may smear, but the glue may be removed during the second sintering.

Figure 1:
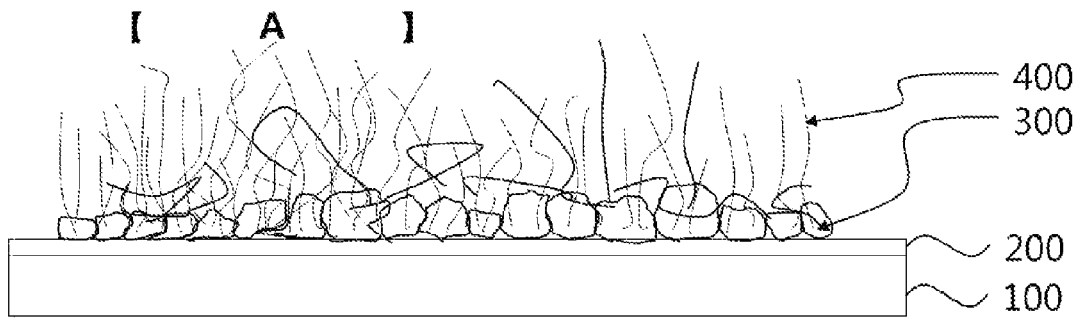
FIG. 1 is a side cross-sectional view of an enlarged portion of a conventional CNT emitter area.

The CNT emitter manufactured through the manufacturing steps as described above properly selects the kind and the content of inorganic filler, unlike conventional CNT emitter in the related art shown in FIG. 1, thereby freely controlling uniformity of the CNT emitter in a predetermined range. In this case, preferable CNT density is controlled so that an average distance between the vertically arranged CNTs is larger than or equal to the length of the CNT itself.

Meanwhile, in a high current device such as an X-ray tube, finally, the negative electrode is strongly adhered to the CNT by using the metals, and electric resistance is reduced, thereby improving uniformity of resistance. However, it is more preferred that the filler which finally exists in a low current device such as an FED, an FEL and the like may obtain a buffer layer effect by using oxide-based conductive materials such as an ITO flit.

From the foregoing, it will be appreciated that various embodiments of the present invention have been described herein for purposes of illustration, and that various modifications may be made without departing from the scope and spirit of the present invention. Accordingly, the various embodiments disclosed herein are not intended to be limiting, with the true scope and spirit being indicated by the following claims.

What is claimed is:

1. A manufacturing method of a carbon nanotube (CNT) emitter, the method comprising:
   (i) fabricating a CNT paste including a plurality of CNTs by dispersing in a solvent, CNT powder, at least two kinds of inorganic fillers which have a lower melting temperature than the CNTs and different oxidation degrees of the CNTs, and an organic binder;
   (ii) coating the CNT paste on an electrode formed above a substrate;

(iii) sintering the substrate coated with the CNT paste to selectively oxidize at least one of the CNTs around one kind of inorganic filler among the at least two kinds of the inorganic fillers to control a density of the CNTs; and (iv) treating a surface of the CNT paste so that the surface of the CNT paste is activated, wherein the at least two kinds of the inorganic fillers include a first inorganic filler having a high standard reduction potential to the CNTs at a predetermined temperature, and a second inorganic filler having a low standard reduction potential to the CNTs at the predetermined temperature, wherein the sintering step (iii) includes oxidizing a group of the CNTs, including the at least one CNT, around the one kind of inorganic filler so as to remove all of the group of CNTs, and control a density of remaining CNTs of the CNTs.

2. The manufacturing method of claim 1, wherein
the first inorganic filler includes a metal that is
selected from a group consisting of Au, Pt, Ag, Cu, Pd, W, and Ni, or
an alloy including at least two selected from a group consisting of Au, Pt, Ag, Cu, Pd, W, and Ni, and
the second inorganic filler includes a metal
selected from a group consisting of In, Fe, Zn, Ti, Cr, Mn, Al, and Ni, or
an alloy including at least two selected from a group consisting of In, Fe, Zn, Ti, Cr, Mn, Al, and Ni.

3. The manufacturing method of claim 1, wherein the sintering step (iii) comprises:
first sintering in a range of 250 to 300° C. under atmosphere; and
second sintering in a range of 350 to 450° C. under the atmosphere.

4. The manufacturing method of claim 3, wherein the sintering step (iii) further includes third sintering in a range of 800 to 900° C. under a vacuum condition.

5. The manufacturing method of claim 1, wherein the treating of the surface (iv) is performed so that the CNTs are vertically arranged.

6. The manufacturing method of claim 1, wherein the fabricating (i) comprises:
forming a dispersion liquid by dispersing the CNTs in another solvent; and
dispersing the CNT paste by adding the at least two kinds of the inorganic fillers and the organic binder into the dispersion liquid.

7. The manufacturing method of claim 1, wherein the density of the CNTs is controlled so that an average distance between the CNTs is larger than or equal to at least one length of the CNTs.

8. The manufacturing method of claim 1, wherein the CNTs are vertically aligned.

9. The manufacturing method of claim 1, wherein the density of the CNTs is controlled so that an average distance between the CNTs is larger than or equal to each length of the CNTs.

10. The manufacturing method of claim 1, wherein in the sintering step (iii), the remaining CNTs are around a second kind of inorganic filler of the at least two kinds of the inorganic fillers.

11. The manufacturing method of claim 10, wherein in the coating step (ii), the group of CNTs are each in direct contact with the one kind of inorganic filler, and the remaining CNTs are each in direct contact with the second kind of inorganic filler.

12. The manufacturing method of claim 1, wherein the at least one CNT is in direct contact with the one kind of inorganic filler.

* * * * *